United States Patent [19]

Ostertag

[11] 4,440,641

[45] Apr. 3, 1984

[54] HOLLOW FILAMENT MODULE AND METHOD AND APPARATUS FOR PRODUCTION OF THE SAME

[75] Inventor: Karl Ostertag, Erlenbach, Fed. Rep. of Germany

[73] Assignee: Akzo NV, Arnhem, Netherlands

[21] Appl. No.: 348,455

[22] Filed: Feb. 12, 1982

[30] Foreign Application Priority Data

Feb. 13, 1981 [DE] Fed. Rep. of Germany ....... 3105192

[51] Int. Cl.³ .............................................. B01D 31/00
[52] U.S. Cl. .................................. 210/321.3; 156/180; 210/433.2
[58] Field of Search ............... 156/433, 169, 180, 195, 156/199, 441; 210/321.1, 321.3, 433.2; 55/158

[56] References Cited

U.S. PATENT DOCUMENTS 3,198,335  8/1965  Lewis et al. ...................... 55/158 X
3,794,468  2/1974  Leonard ............................. 23/258.5
4,163,305  8/1979  Semjonow et al. ............. 156/433 X Primary Examiner—Frank A. Spear, Jr.
Attorney, Agent, or Firm—Michael J. Striker

[57] ABSTRACT

A hollow filament module comprising an annular package of hollow filaments having a longitudinal axis, an axially extending flow channel of a hardened mass, and an outer mantle likewise of a hardened mass coaxial with said flow channel and radially outwardly arranged from the latter, the hollow filaments forming the package being curved and of substantially equal lengths and extending in substantially radial direction in planes forming with the aforementioned axis an angle of substantially 90°, the filaments in adjacent planes crossing each other and engaging each other at crossing points, each of the hollow filaments having two open ends embedded in the hardened mass so that fluid may flow through the respective filament, the open ends of some of the filaments being arranged to at least communicate with the axially extending flow channel, and the open ends of some of the filaments being arranged to at least communicate with the peripheral surface of the outer mantle; and a method of forming the hollow filament module as well as an apparatus for forming the annular package of hollow filaments.

14 Claims, 9 Drawing Figures

HOLLOW FILAMENT MODULE AND METHOD AND APPARATUS FOR PRODUCTION OF THE SAME

BACKGROUND OF THE INVENTION

The present invention relates to a hollow filament module comprising an annular passage of hollow filaments having a longitudinal axis and an axially extending flow channel formed of a hardened mass, whereby hollow filaments of curved form and substantially equal lengths are arranged in substantially radial direction in planes including with the longitudinal axis substantially angles of 90° and in which the hollow filaments in adjacent planes cross each each other and engage each other at the crossing point thereof, at which both ends of each hollow filament are in such a manner embedded and exposed in the hard mass so that fluid may flow therethrough, and in which hollow filaments communicate with the axially extending flow channel.

Devices in which material or heat transmission through the wall of hollow filaments occurs, which eventually acts as a membrane, are known per se. It is also known to arrange the used hollow filaments in the form of hollow filament modules, which, similar to known filter cartridges, after extended use may quickly and simply be exchanged for new or regenerated hollow filament modules. Such filament modules find increasing use in various technical and medical fields, whereby depending on the composition of the hollow filaments heat transmission, material exchange, material separation or a combination of such transactions is carried out.

In all the cases in which a cleaning or regeneration of the soiled or exhausted hollow filament modules is not possible, and in which the same have to be discarded after extended use, there existed the demand for such hollow filament modules which, on the one hand, are universally usable and which have a high efficiency and which, on the other hand, can be constructed in a simple manner and with reasonable costs.

A hollow filament module of the aforementioned kind is disclosed in U.S. Pat. No. 3,198,335. This known hollow filament module has, however, the disadvantage that only two fluids may be used for heat or material transmission, whereby one of the fluids passes through the hollow filaments whereas the other fluid flows around the hollow filaments. Furthermore, since the length of the hollow filaments is twice the thickness of the hollow filament package in radial direction, the pressure losses in the hollow filaments are correspondingly rather high, and the fluid flowing therethrough correspondingly rather small, so that the exchange output is unsatisfactory. When using this known module as a heat exchanger, there occurs also, due to the return flow of the fluid passing through the hollow filaments to the center, a return exchange.

SUMMARY OF THE INVENTION

It is therefore an object of the present invention to provide a hollow filament module in which considerably smaller pressure losses occur in the hollow filaments than in the modules according to the prior art, so as to obtain an increased exchange efficiency, and in which also more than two fluids can participate in a heat and-/or material transmission.

To obtain the desired result, the hollow filament of the hollow filament module according to the present invention has also open ends at the outer peripheral surface of the module, whereby these ends of the hollow filaments are likewise embedded in a hardenable mass forming the outer mantle of the module.

In a preferred embodiment according to the present invention, each hollow filament communicates with one of the open ends with the axially extending flow channel and with its outer open end with the outer peripheral surface of the module. At such an arrangement, the hollow filaments have a relatively short length so that the pressure losses in these hollow filaments with such embodiment are the smallest. In connection with an arrangement of the hollow filaments in substantially circular sector shape, a hollow filament module is derived which with regard to its exchange capacity and its economy can hardly be surpassed.

If in the above mentioned construction the axial flow channel is divided by a plurality of separating walls extending parallel and/or normal to the axis in a plurality of chambers, a plurality of fluids corresponding to the number of the thus formed chambers may participate at the heat or material transmission with the fluid flowing around the hollow filaments. For the same purpose, the outer mantle may also be provided with annular or axially extending web-shaped separating walls in correspondence with the dividing of the axial flow channel into chambers. It is, however, also possible to insert the hollow filament module according to the present invention into a housing which is subdivided into a plurality of chambers, in which the chambers are provided with connections for feeding fluid into and out from the individual chambers.

According to a further embodiment of the present invention, two main groups of hollow filaments are arranged in such a manner that all open ends of one group communicate with the axially extending flow channel, whereas the open ends of the other group are arranged on the peripheral outer mantel surface of the module. This embodiment permits, without subdividing the axially extending flow channel into chambers, heat or material exchange between three fluids. If in such an embodiment the axial flow channel is subdivided into chambers and a corresponding subdivision of the outer mantle surface of the module in the corresponding region is carried out, the number of fluids to be treated can be increased to a considerable extent.

If in this embodiment hollow filaments with different characteristics are used for the two hollow filament groups, it is possible to treat in such a hollow filament module in especially advantageous manner such fluids which react differently to different membranes. In this way, it is possible to separate from the fluid to be treated two different substances, whereby one of these separated substances is transmitted to the axial flow channel and the other to the outer mantle surface of the module. The hollow filament module according to the present invention—as usual—have in longitudinal direction a uniform cross section as to shape and/or size. It is, however, also possible, and for special applications advantageous, to construct the hollow filament module according to the present invention in such a manner that it presents a cross section which changes in the longitudinal direction of the module in its size and/or shape. Thus, the hollow filament module may have the form of a cone or pyramid frustum, but also for instance a barrel shape or a diabolo shape. Also, the axial flow channel may have a cross section different from the outer cross section of the hollow filament package.

To reduce the duration in which the fluid or fluids remain in the axially extending flow channel, it is possible to arrange in the latter a displacement body of a form in proportion to that of the flow channel, so that an axial flow channel of annular cross section is created. This displacement body may also be constructed so that the cross section of the thus formed annular axial flow channel increases or decreases in direction of the fluid passing therethrough, that is the displacement body may for this purpose have for instance the form of a cone or of a cone frustum.

The annular cross section in the sense of the present invention has to be understood not only as being constituted by a circular annular cross section, even though such is preferred for reasons of manufacture, but also for instance as an oval or elliptical annular cross section or a cross section resulting from a polygon with rounded edges.

For the manufacture of the hollow filament module according to the present invention all known hollow filaments may be used which are suitable for heat transmission, material transmission, material separation and material exchange—for instance for osmosis, reverse osmosis, dialysis, washing of blood, and so on—whereby such hollow filaments may be produced in a dry- or wet-spinning process or an extrusion process. The hollow filaments used may have a cross section of any form, whereby the size of the cross section of the hollow filaments as well as the wall thickness thereof is not limited. Hollow filaments of circular cross section may for instance have an outer diameter of a few thousandths of one millimeter, but also of 5 millimeters and larger. The wall thickness of the hollow filaments may for instance be five thousandths of a millimeter. For the production of a hollow filament module according to the present invention, such hollow filaments have proven especially advantageous which have a heat transmission coefficient in the range of 1500 to 4500 $W/m^2K$ and higher. To increase the heat transmission of such hollow filament modules, it may be advantageous to use such hollow filaments which contain material of good heat conducting capacity, such as metal, graphite, or the like, in particulated form. The hollow filaments may also be provided with fillers, additives, stabilizers, soot, pigments, or the like. By the use of porous hollow filaments the region of using the same can be increased in an advantageous manner.

For use of the hollow filament module according to the present invention for washing of blood or separation of alcohol from beverages, such hollow filaments have especially proven to be useful which for molecules of a molecular weight of more than 100 have a small permeability, whereby such hollow filaments are preferred which have a high selectivity, that is which show a sharp separating characteristic. Such hollow filaments can for instance be manufactured by regeneration of cellulose from a copper ammoniate-cellulose-solution.

The hollow filament module according to the present invention may be produced at any length or cross section.

Usual adhesives, hardenable casting material, casting resins, or the like, may be used for embedding the ends of the hollow filaments.

If the hollow filament module according to the present invention is to be used for heat transmission or as heat accumulator, the hollow filaments may be embedded over their whole length in a mass of good heat conductive characteristic.

Depending on the composition of the hollow filaments for the hollow filament module according to the present invention, hydraulic as well as well as gaseous fluid may be used for heat- or material transmission.

The hollow filament according to the present invention may be produced according to a method which comprises the steps of advancing an elongated hollow filament in longitudinal direction placing the advancing filament onto a supporting surface while moving the latter in such a manner that all points thereof move respectively along endless paths having a common center and moving successive points of the advancing filament along a second endless path having a second center located laterally at a given distance from the common center and in which the distance of any point of the second path from the second center is smaller than the given distance, so as to produce a package of hollow filaments of annular cross section and any desired height, subsequently embedding inner and outer regions of the annular package of hollow filaments in a mass of hardenable material, removing after hardening of the mass part of the latter so as to divide said elongated hollow filaments of the formed package into a plurality of hollow filament sections of substantially equal length, the ends of which are embedded in the hardened mass and provided with openings.

In a preferred form of the method according to the present invention, the supporting surface is rotated about a vertical axis.

In an especially preferred embodiment according to the present invention, at least one hollow filament of considerable length is guided and continuously advanced by advancing means which are rotated about a first vertical axis and the advancing filament is placed on a supporting surface rotating about a second vertical axis, wherein the radius of the circular path followed by the advancing means is smaller than the distance of the first from the second axis.

The hollow filament module according to the present invention may, however, also be produced in a manner in which the hollow filament loops are placed on a supporting surface which carries out an elliptical path or which carries out translatory movement which one after the other extend in different directions so that each point of the supporting surface carries out a triangular, quadrangular, or similar movement. It is also possible to superimpose a translatory movement upon the rotary movement of the supporting surface so as to produce in this way a hollow filament module of any cross section.

An apparatus as disclosed in the DE-OS No. 28 09 661 has proven suitable to manufacture a hollow filament package for the hollow filament module according to the present invention.

A still further improvement is an apparatus according to the present invention which includes means movable along a horizontal circular path of a given radius for continuously guiding and advancing the filament, a horizontal supporting surface located below the advancing means and rotatable about a vertical axis spaced from the center of the circular path a distance greater than the given radius.

The filament guiding and advancing means preferably comprise a pair of driven rolls rotatable about parallel axes and formed at the outer periphery thereof with annular grooves forming together in a plane including the axes of the rolls an annular opening corresponding to the outer diameter of the filament. Preferably, at least the groove formed at the outer periphery of each roll is lined with a soft elastic material such as rubber, plastic, foam rubber, or the like.

Such a device for simultaneously guiding and advancing the hollow filaments may for instance advantageously be used directly below a spinning machine producing the hollow filaments, so that in this way the package of hollow filaments for the hollow filament module according to the present invention may be located directly at the spinning machine so that the hollow filament may not first be wound up on a spool. Such a method is especially suitable for the production of hollow filaments from polocarbonates, in which the danger exists that such hollow filaments, due to their smaller rigidity, be pressed together during the winding thereof on a spool. The withdrawal of the hollow filaments from the spinning member may for instance also be carried out with the aid of injectors or any intermediate withdrawal device.

The hollow filament package produced in the above described manner may also be subjected after its production to an eventually necessary chemical or physical aftertreatment, such an aftertreatment can be carried out on the hollow filament package after it has been produced or at the finished hollow filament module itself.

The great advantage of the method according to the present invention resides in the careful treatment and stressless positioning of the hollow filaments. To prevent lateral sliding of the individual hollow filament layers during the manufacture thereof, it may be advantageous to provide the moving supporting surface with side walls corresponding to the form and size of the hollow filament package, that is to use for instance a pot-shaped supporting device or a supporting device with concentric tubular side walls.

It is also possible according to the present invention to arrange a plurality of hollow filament modules in a series or parallel arrangement in a common housing.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
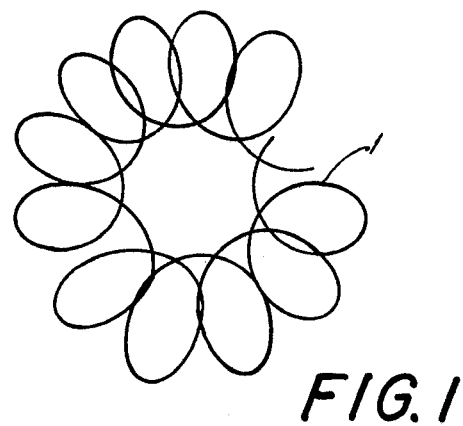
FIG. 1 illustrates a preferred from in which the hollow filament is arranged.
Figure 9:
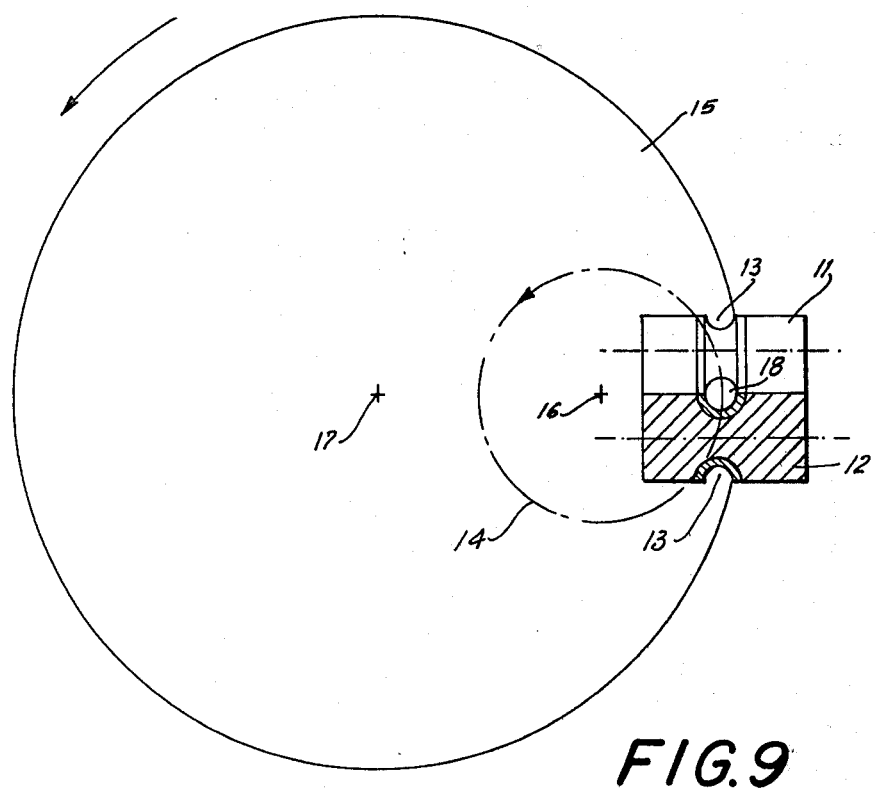
FIG. 9 schematically illustrates a device for the production of a preferred hollow filament package for producing a hollow filament module according to the present invention.

FIG. 1 illustrates part of an elongated hollow filament 1 disposed in form of a plurality of loops. The arrangement of the hollow filament 1 as illustrated in FIG. 1 results for instance from disposing of an elongated hollow filament with a device as illustrated in FIG. 9, which will be described in further detail below. For the production of a package of hollow filaments, as is suitable for the production of the hollow filament module according to the present invention, it is possible to superimpose a plurality of many such layers of hollow filament loops angularly offset with respect to each other through any desired angles so as to produce a hollow filament package of any height with an annular cross section which in longitudinal direction appears apparently without interruption.

Figure 2:
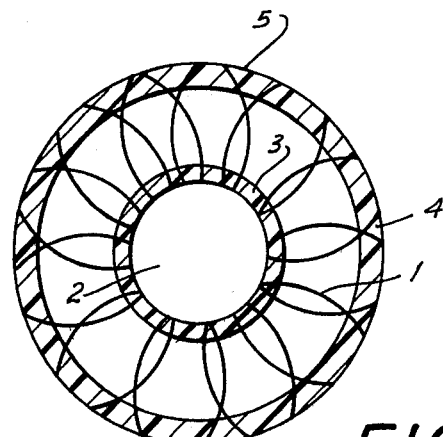
FIGS. 2 and 3 schematically illustrate a cross section through preferred embodiments of hollow filament modules according to the present invention.

If now the thus produced hollow filament package is embedded in the outer and inner region of the filament in a hardenable casting mass, and if after hardening of the mass part of the same up to the region of the filament package is again removed, and in this way the elongated hollow filaments forming the passage is divided into a plurality of filament sections of equal lengths, the ends of which are embedded in the hardened mass, and the openings of which are in this manner freed, then there will result an embodiment of a hollow filament module according to the present invention of a cross section as schematically illustrated in FIG. 2. This modification comprises an axial flow channel 2 of circular cross section formed from the hardened casting mass 3 and the module mantle 4 likewise formed from hardened casting mass. In this modification each of the hollow filament sections 1 ends with one of its open ends in the axial flow channel 2 and with the other open end on the peripheral surface 5 of the mantle 4.

Figure 3:
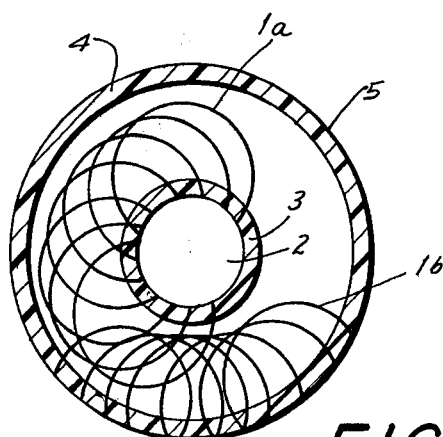

FIG. 3 schematically illustrates a cross section through another embodiment of a hollow filament module according to the present invention, in which both open ends of a part of the hollow filament section communicate with the axial flow channel 2 and the open ends of another part of the filament sections communicate with the peripheral surface 5 of the module mantle 4. As shown, the filament section 1a of one group communicate with the open ends thereof with the axially extending flow channel 2, whereas the open ends of the filament sections 1b of the other group end at the peripheral surface 5 of the module mantle 4. A hollow filament package suitable for the embodiment of the hollow filament module as illustrated in FIG. 3 can for instance be produced by simultaneously disposing two elongated hollow filaments, whereby the filament loops formed from the first group of filament sections 1a are disposed on an annular surface of smaller outer diameter than the hollow filament loops formed by the second group of filament sections 1b. In the embodiment illustrated in FIG. 3, the filament sections 1a are only at the inner region of these filament sections embedded in a hardenable casting mass, whereas the second group formed by the filament sections 1b only the outer regions of these sections are embedded in a hardenable casting mass. To stabilize the hollow filament package it is however also possible to embed the outer regions of the first group of hollow filaments formed by the filament sections 1a respectively the inner regions of the second group formed by the hollow filament sections 1b also in a hardenable casting mass. Thereby care has to be taken that these regions of the hollow filaments are not accidentally damaged and thereby opened. The embodiment illustrated in FIG. 3 is especially suitable for the simultaneous but separate separation of two different fluids responding to different membranes.

Figure 4:
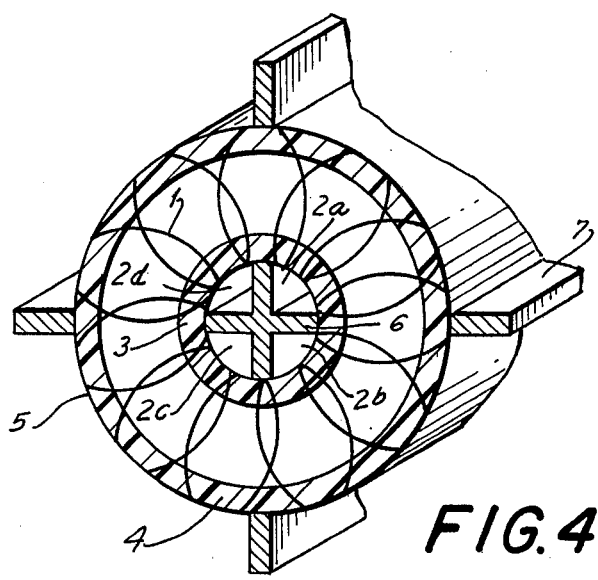
FIG. 4 is a schematic partial perspective illustration of a hollow filament module according to the present invention provided with separating walls parallel to the longitudinal axis of the module.

FIG. 4 illustrates a further embodiment of a hollow filament module which corresponds in some respects to the embodiment as shown in FIG. 2, in which however the axial flow channel 2 is subdivided by separating walls 6 extending parallel to the longitudinal axis of the module into four flow channels 2a-2d. This embodiment is further provided with four web-shaped separating walls spaced by 90° and projecting in radial direction parallel to the longitudinal axis of the module from the peripheral surface 5 of the module mantle 4. If such a module is inserted into a housing provided with a corresponding number of connections for feeding fluids thereinto and discharging therefrom, it is possible for instance to use four different fluids flowing outwardly from the central channels through the filament sections 1, and be used for heat or material transmission onto a fifth fluid flowing about the hollow filament sections. The flow of fluid through the hollow filament sections can also proceed from the outside to the center of the module, and it is also possible that the various fluids flow in opposite directions.

As further shown in FIGS. 1–4, the hollow filament sections in the embodiments of the hollow filament modules illustrated in these Figures are curved substantially along circular segments.

Figure 5:
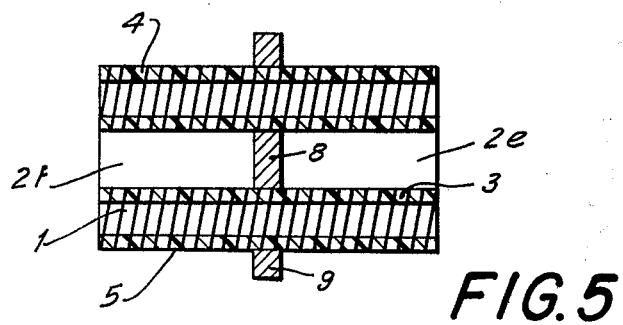
FIG. 5 schematically illustrates in a longitudinal cross section a hollow filament module according to the present invention with separating walls extending normal to the longitudinal axis thereof.

FIG. 5 illustrates a further embodiment of a hollow filament module according to the present invention in longitudinal section, in which the axially extending flow channel 2 is divided by a separating wall 8 extending normal to the longitudinal axis of the module into two chambers 2e and 2f. On the peripheral surface 5 of the mantle 4 is also an annular separating wall 9 which is normal to the longitudinal axis of the module and aligned with the separating wall 8 in the interior of the axially extending flow channel 2. This embodiment may be used for transmission of heat or material from two different fluids onto a third one, or vice versa. If the axially extending flow channel 2 is divided by a plurality of separating walls 8 into more than two chambers, then it is necessary to provide the inner located chambers with outwardly extending conduits for feeding fluid into or discharging fluids therefrom.

Figure 6:
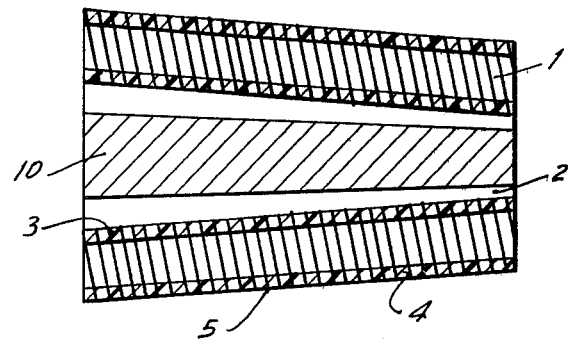
FIG. 6 schematically illustrates a longitudinal cross section through a hollow filament module according to the present invention in which the module has a cross section which varies in its longitudinal direction and in which a displacement body is arranged in its axial flow channel.

FIG. 6 illustrates in a longitudinal cross section a further embodiment of a hollow filament module according to the present invention in which the module has a cross section the size of which changes in longitudinal direction. Furthermore, a displacing body 10 is arranged extending coaxially through the flow channel 2 and this displacing body 10 has also a cross section the size of which changes in the longitudinal direction thereof, so that the axially extending flow channel obtains an annular cross section which changes likewise in the longitudinal direction of the module.

Figure 7:
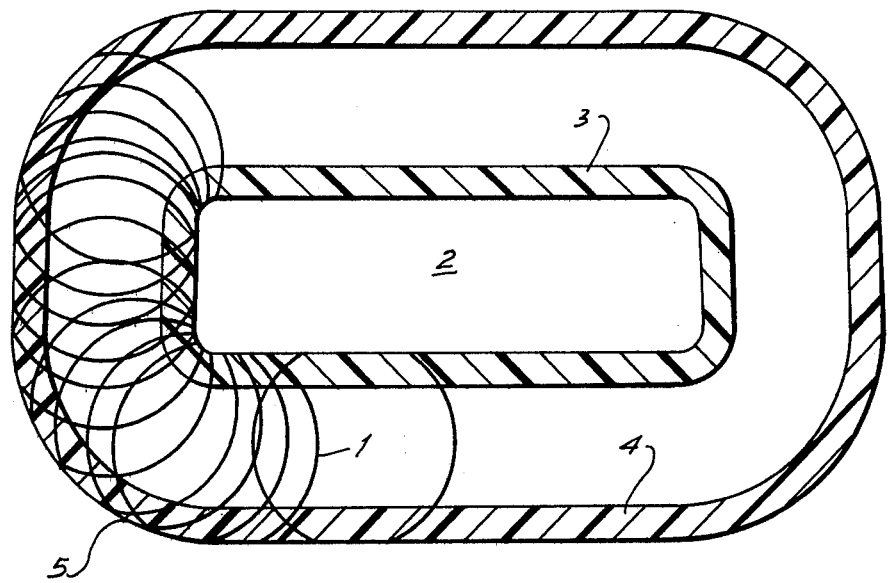
FIG. 7 schematically illustrates a transverse cross section through a hollow filament module according to the present invention with an essentially rectangular cross section.

FIG. 7 illustrates an additional embodiment of a hollow filament module according to the present invention which differs from the embodiment shown in FIG. 2 in that this module has a substantially rectangular cross section.

Figure 8:
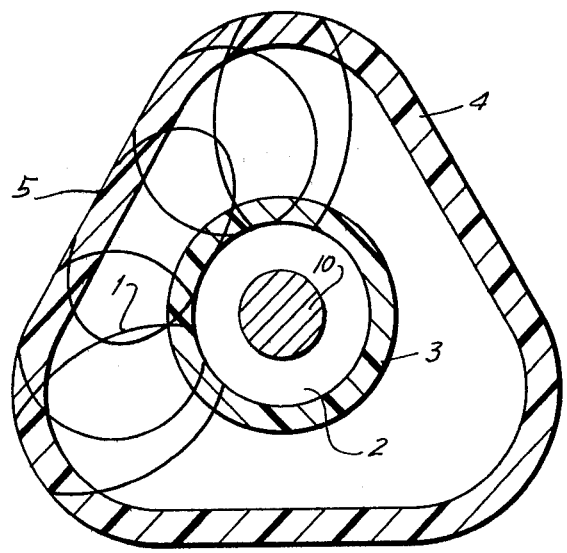
FIG. 8 schematically illustrates a transverse cross section through a hollow filament module according to the present invention of a substantially triangular cross section and with a displacement body in its axial flow channel so as to form an annular axially extending flow channel.

FIG. 8 illustrates a further embodiment of a hollow filament module according to the present invention which differs from that shown in FIG. 2, in that it has a substantially triangular cross section, and in which also by arrangement of the displacement body 10 of circular cross section the axially extending flow channel 2 receives an annular cross section.

FIG. 9 schematically illustrates in a top view an apparatus for the production of a hollow filament package corresponding to FIG. 1.

In the schematic illustration of the apparatus are only such parts shown which are absolutely necessary for the proper understanding of the function of the apparatus, whereas other elements, for instance for the drive of the various elements illustrated, are omitted from FIG. 9. The apparatus according to the present invention illustrated in FIG. 9 comprises a pair of driven rolls 11 and 12 whereby the roll 12 is illustrated in longitudinal section. Both rolls 11 and 12 are provided with an annular groove 13 of semicircular cross section. The groove 13 of the two rolls 11 and 12 form in a plane including the longitudinal axes of both rolls a circular opening 18 suitable for the transport of circular hollow filaments of corresponding cross section. Both rolls 11 and 12 are mounted in a manner not shown in FIG. 9 for rotation about their axes and are driven by a likewsie non-illustrated drive means about their longitudinal axes. The pair of rolls 11 and 12 are further movable on a horizontally extending circular path 14 by means likewise not shown in FIG. 9. Beneath the pair of rolls 11 and 12, and at a certain distance therefrom, there is arranged a circular, horizontally extending supporting face 15 which is rotatable about its central axis. As clearly shown in FIG. 9, the radius of the circular path 14 along which the pair of rolls 11 and 12 are moved is smaller than the distance of a vertical axis extending through the center 16 of the circular path 14 from the axis of rotation extending through the center 17 of the surface 15. For instance the radius of the circular path 14 carried out by the roll pair 11, 12 may be 25 mm, whereas the distance between the two axes from each other may for instance be 36 mm. The radius of the circular path 14 along which the pair of rolls 11, 12 move has to be chosen in such a manner that buckling of the hollow filaments distributed in loop form will be positively prevented. The apparatus as illustrated in FIG. 9 may also be provided with a device for changing the vertical distance between the pair of rolls 11 and 12 and the supporting surface 15. It is also possible to rotate the pair of rolls 11 and 12 and the supporting surface 15 in opposite directions.

It will be understood that each of the elements described above, or two or more together, may also find a useful application in other types of hollow filament modules differing from the types described above.

While the invention has been illustrated and described as embodied in a hollow filament module, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hollow filament module comprising an annular package of hollow filaments having a longitudinal axis, an axially extending inner flow channel element of a hardened mass and an outer element likewise of hardened mass coaxial with the inner flow channel element and radially outwardly arranged from the latter, the hollow filaments forming said package being curved and of substantially equal lengths and extending in substantially radial direction in planes forming with said axis an angle of substantially 90°, the filaments in adjacent planes crossing each other at crossing points and engaging each other at said crossing points, each of said hollow filaments having two open ends embedded in the hardened mass of the respective element so that the open ends of at least some of the filaments are arranged to communicate with said axially extending inner flow channel element and the open ends of at least some of the filaments are arranged to communicate with the peripheral surface of said outer element and fluid will flow through the respective filaments.

2. A hollow filament module as defined in claim 1, wherein each of said hollow filaments is curved substantially along a circular segment.

3. A hollow filament module as defined in claim 1, wherein one open end of each hollow filament is arranged to communicate with said axially extending flow channel element and the other open end of each hollow filament is arranged at the outer peripheral surface of said outer element.

4. A hollow filament module as defined in claim 1, wherein both open ends of some of said hollow filaments communicate with said axial flow channel element, whereas both open ends of some other hollow filaments are arranged at the outer peripheral surface of said outer element.

5. A hollow filament module as defined in claim 1, and including at least one separating wall extending parallel to said axis through said flow channel element and dividing the latter into at least two flow channels.

6. A hollow filament module as defined in claim 1, and including at least one separating wall extending normal to said axis through said axial flow channel element and dividing the latter into at least two chambers each having an open end for the passage of fluid into or out from the respective chamber.

7. A hollow filament module as defined in claim 5, and including a plurality of web-shaped separating walls projecting in radial direction circumferentially spaced from each other and parallel to said axis from the outer peripheral surface of said outer element, the number and arrangement of said web-shaped separating walls corresponding to that of the separating walls extending through said flow channel element.

8. A hollow filament module as defined in claim 6, and including at least one annular separating wall projecting normal to said axis radially outwardly from the outer peripheral surface of said outer element and being aligned with said at least one separating wall extending normal to said axis through said flow channel element.

9. A hollow filament module as defined in claim 1, wherein said flow channel element has a cross section which changes in direction of said axis.

10. A hollow filament module as defined in claim 1, wherein a fluid displacement body extends substantially in axial direction through said flow channel element.

11. A hollow filament module as defined in claim 9, wherein a fluid displacement body extends substantially in axial direction through said flow channel element.

12. A method for producing a hollow filament module which comprises an annular passage of hollow filaments having a longitudinal axis, an axially extending inner element with a flow channel and formed of a hardened mass and an outer element of a hardened mass coaxial with said inner element and radially outwardly arranged from the latter, the hollow filaments forming the package being curved and of substantially equal lengths and extending in substantially radial direction in planes forming with said axis an angle of substantially 90°, the filaments in adjacent planes crossing each other at crossing points and engaging each other at said crossing points, each of said hollow filaments having two open ends embedded in the hardened mass of the respective element so that the open ends of at least some of said filaments are arranged to communicate with the flow channel of the inner element and the open ends of at least some of said filaments are arranged to communicate with the peripheral surface of the outer element, said method comprising the steps of advancing an elongated hollow filament in longitudinal direction; placing the advancing filament onto a supporting surface while moving the supporting surface in such a manner that all points of said supporting surface respectively move along endless paths having a common center and moving successive points of the advancing filament along a second endless path having a second center located laterally at a given distance from said common center and in which the distance of any point of said second path from said second center is smaller than said given distance so as to produce a package of hollow filaments of an annular cross section and any height; subsequently embedding inner and outer regions of said annular package of hollow filaments in a mass of hardenable material; removing after hardening of the mass part of the latter so as to divide said elongated hollow filaments of the formed package into a plurality of hollow filament sections of equal length the end of which are embedded in the hardened mass and provided with openings.

13. A method as defined in claim 12, wherein said supporting surface is rotated about a vertical axis.

14. A method as defined in claim 13, wherein at least one hollow filament is continuously advanced by advancing means which are rotated about a first vertical axis and the advancing filament is placed on said supporting surface which is rotated about a second vertical axis, and wherein the radius of the circular path carried out by said advancing means is smaller than the distance of the first from the second axis.

* * * * *